Figure 1:
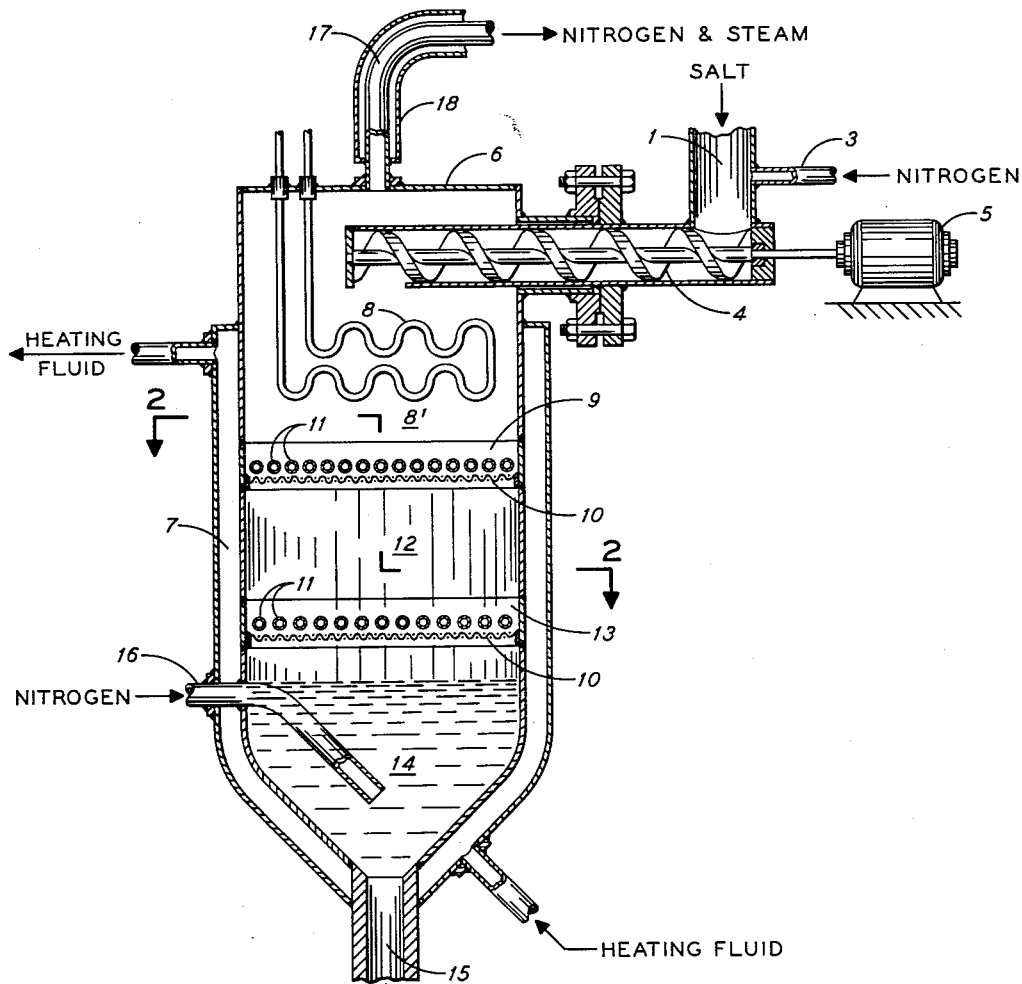

June 6, 1961 F. G. LUM 2,987,506
CONTINUOUS PROCESS FOR THE PREPARATION OF SUPERPOLYAMIDES
Filed May 17, 1957

INVENTOR
FUNSTON G. LUM
BY
ATTORNEYS

United States Patent Office 2,987,506
Patented June 6, 1961

2,987,506
CONTINUOUS PROCESS FOR THE PREPARATION OF SUPERPOLYAMIDES
Funston G. Lum, Richmond, Calif., assignor to California Research Corporation, San Francisco, Calif., a corporation of Delaware
Filed May 17, 1957, Ser. No. 659,869
5 Claims. (Cl. 260—78)

This invention relates to the preparation of synthetic polymers of the polyamide type, and more particularly to a novel continuous process for the preparation of polyamides from superpolyamide-forming diamines and dibasic carboxylic acids.

High molecular weight polyamides derived from the condensation of a diamine and a dibasic carboxylic acid with the liberation of water to produce linear polymers useful for example, as films, molding compositions, fibers for textile applications, bristles, and tire cord manufacture are known.

Recently, nylon type superpolyamides have been developed which are superior to commercially available nylons in certain important respects as described, for example, in U.S. Patent No. 2,760,221 and U.S. application Serial No. 382,888, filed September 29, 1953. These newer materials are derived from metaxylylenediamine or mixtures thereof with paraxylylenediamine (5 to 95% by weight) and an aliphatic dibasic carboxylic acid. Included among the acids are $\alpha$, $\omega$-aliphatic dibasic acids of 6 to 10 carbon atoms. Particularly suitable are those aliphatic $\alpha$, $\omega$-dibasic acids of an even number of carbon atoms, i.e. adipic, sebacic, and suberic. These superpolymers generally have a molecular weight above 10,000 and are generally crystalline in structure with sharp melting points. The choice of dibasic acid varies with the application, cost, and availability. For example, the high melting polymers from the available low cost adipic acid are useful in most fiber, film and molding applications, as they yield products with high strength, high modulus, and excellent dimensional stability at high temperatures. The polymers from sebacic acid are best suited for molding application where extreme toughness is essential, and monofil applications, such as bristles and fishing lines, where flexibility and low sensitivity to moisture are essential. As will readily occur to those skilled in the art, polymers of wide range of properties are also possible through copolymerization.

In the preparation of the polyamide materials starting from high melting reactants, it has been essential to heat, usually in an autoclave or first in pipes followed by the autoclave, aqueous solutions of the polymer-forming material under pressure to maintain a fluid state and to form first a low polymer for the purpose of minimizing diamine loss, followed by controlled removal of the steam and reduction of pressure to avoid solidification, and further polymerization of the low polymer by heating at atmospheric pressures or below to produce the desired high molecular weight polymer. As will readily occur to those skilled in the art, such processes possess certain disadvantages in commercial operations. For example, batch operation is time consuming, and operation under pressure requires pressure-control equipment, thus placing additional limitations on the polymerization process.

It has now been found in accordance with the present invention that nylon polymers prepared from metaxylylenediamine and a suitable dibasic carboxylic acid can be prepared by a process which is continuous and in which polymerization is effected under substantially atmospheric pressures.

Broadly stated, the invention herein contemplated involves the progressive polymerization from salt or low polymer to high polymer by a process which comprises passing metaxylylenediamine dicarboxylic acid salt through a reaction zone under substantially atmospheric pressures, the reaction zone being heated to a temperature sufficient to melt and convert the salt into polyamide and to maintain the reaction product in the molten state. Continual removal of the product allows the addition of fresh salt or low polymer. During the polymerization reaction, water, the product of the reaction, is liberated as steam, which has to be removed before high polymers are formed. An inert gas, such as nitrogen, is introduced into one end of the reaction zone and continuously bubbled through the molten reaction mass to remove the liberated steam. It has been found that in operating as hereinbefore described and with the use of an overhead steam or hot water jacketed condenser for returning dissociated metaxylylenediamine, losses of metaxylylenediamine are easily controlled to within the range of about 0.2% to 1% based on the diamine in the salt charged. This amount does not prevent the preparation of the desired high molecular weight polymers which would otherwise occur due to an improper balance of reactants. This small amount of diamine carried over is condensed with the steam on further cooling and can be recovered by evaporation, if desired. At any rate, the small amount of lost diamine can be turned to good advantage, in that by its loss the resulting excess of acid can serve to control the degree of polymerization, thus obviating the need for adding a viscosity stabilizer.

To facilitate the removal of steam, the reaction zone is provided with means, such as perforated plates, screens, baffles or indentations, e.g., Vigreux indentations, to disperse or break up the bubbles of nitrogen and to agitate the reaction mass. The inert gas is thus caused to permeate the reaction mass thoroughly, whereby water is efficiently removed, and as a result, since the polymerization reaction is an equilibrium reaction, to expedite the reaction to the desired degree of completion.

Figure 2:
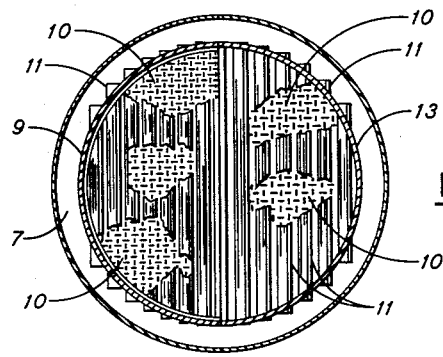

The invention will now be more fully described in connection with the accompanying drawings, like numerals indicating like elements, in which:

FIG. 1 is a vertical cross-sectional view of the reaction chamber schematically illustrating the flow of feed and product, and FIG. 2 is a cross-sectional plan view taken in the direction of arrows 2—2 in FIG. 1.

Referring now to FIG. 1, polymer-forming salt, e.g., metaxylylenediammonium adipate in hopper 1, blanketed with an inert atmosphere, e.g., nitrogen, introduced through line 3, is fed by means of screw conveyor 4 driven by motor 5 into the top of vessel 6 surrounded with jacket 7 containing heating fluid to provide the necessary heat for polymerization and distillation of water and for maintaining the reaction mass in fluid condition. To provide for better heat transfer and thus to prevent solidification, zone or compartment 8' of reaction vessel 6 may be provided with additional heating coils 8, containing circulating heating fluid. (The screw conveyor can be a heated extruder to first melt the salt, if desired.)

As the salt polymerizes, the polymerized product falls in zone 9 comprising spaced tubes 11 and through grid or screen 10 for dispersal of polymer downward and inert gas upward. Grids or screens having a mesh size of 8 to 10 will generally be found satisfactory. During this stage of the reaction a low polymer is formed, and depending on the degree of water removal and the time in this zone, the polymer may have a reduced viscosity in about the range of 0.5 to 0.9 at 0.5% metacresol (reduced viscosity as described in "Journal of Colloid Science," vol. 1, p. 261 (1946).

Low polymer continuously hits zone 9 comprising heated spaced tubes 11 and grid or screen 10. The tubes may be positioned parallel to one another and spaced from one another at a distance, say, 1/16" to 1/2", such as to furnish sufficient heat to melt and polymerize salt and still allow molten polymer to flow therethrough at a satisfactory rate. Polymer passing through grid or screen 10 then passes through an intermediate zone 12 in the reaction vessel, progressively polymerizing to higher polymer. Polymer then, as it descends through the reaction zone, passes through another zone 13, which may be of similar construction to that of zone 9, and having the tubes farther spaced, e.g., 1/2 to 1", and then into a molten polymer pool 14 in the bottom section of the vessel, where the polymerization reaction is completed, and whence polymer of the desired viscosity, e.g., having a reduced viscosity of 1 to 2 is continuously withdrawn through outlet 15. In general, the polymerization reaction from start to finish will require 1 to 8 hours, and more usually 2½ to 6 hours, again depending on desired molecular weight, temperature and the withdrawal rate of water formed during the condensation reaction.

During the polymerization an inert gas, e.g., nitrogen, is bubbled through the reaction mass to drive out the water as steam. Accordingly, nitrogen is continuously introduced into the reaction zone through line 16. The rate of nitrogen introduction affects the degree of water removal, and hence the rate of polymerization. Thus a rate of nitrogen introduction of about 1/2 to 1 cu. ft. per pound of polymer withdrawn will be found satisfactory in effecting the polymerization reaction as above described.

The nature and arrangement of the grids or screens causes the molten polymer to expose more surface and the streaming nitrogen to disperse in finer bubbles, whereby the polyamide mass is more thoroughly permeated. In this connection, it will readily occur to those skilled in the art that in place of the grids or screens above described, other suitable means for dispersing the nitrogen may be used. Thus, in place of the grids or screens, baffles, indentations, perforated discs, and the like, capable of increasing surface and deflecting the inert gas to give better agitation can be employed, if desired. Also, the reaction time can be reduced if the polymer were transferred to a separate vessel where mechanical agitation or vacuum can be applied to speed the reaction.

Nitrogen carrying entrained steam and metaxylylenediamine issues from the bubbly reaction mass and passes into condenser 17. Condenser 17 is so operated and so equipped, as with steam or boiling water jacket 18, to permit condensation of metaxylylenediamine, which returns to the reaction zone, but to allow the escape of nitrogen and steam from the system.

Referring to FIG. 2 a top view of the screen 10 and tubes 11 is given. The tubes are shown to be in free fluid communication with heating jacket 7.

As stated the temperatures maintained in the reaction zone are sufficiently high to effect polymerization and to maintain the reaction products in fluid or molten condition. Temperatures above the melting point of the polymer will therefore be caused to prevail. In general, temperatures equal to the melting point of the polymer or about 20° F. to 30° F. above will be found satisfactory.

Since temperatures depend on melting point of the polymer desired, these can vary somewhat depending on the polymer. Thus, temperatures of the order of 470° F. to 510° F. can advantageously be employed for the adipic polymer, while a lower temperature range can be employed for lower melting polymers, e.g., around 400° F. to 510° F., for the sebacic polymer. Usually, a temperature of around 500° F. will be found satisfactory for the preparation of most superpolyamides of metaxylylenediamine.

In virtue of the degree of polymerization effected during the course of the reaction it may be found advantageous to prepare the polymer by a staged polymerization; i.e., lower temperature of polymerization can be employed in the initial polymerizataion followed by polymermization at higher temperatures. Thus, during the polymerization to form, for example, low adipic polymer (reduced viscosity of 0.5 to 0.9), temperatures of the order of 470° F. to 510° F. can be employed, while temperatures of the order of 480° F. to 520° F. in furthering the polymerization to produce high polymer (reduced viscosity of 1 to 2) will be found satisfactory. Similarly, temperatures about 20 to 30° F. above the melting points of the polymers can be employed for other polymers.

As an example in the preparation of polymers in accordance with the present invention, there is continuously charged metaxylylenediammonium adipate salt into a glass tube 20 inches long, having a diameter of 1¼ inches, and provided with a set of four equidistant Vigreaux indentations, spaced 2 inches apart starting at 2 inches from the bottom of the tube jacketed with a heated aluminum block. The tube is also provided with a nitrogen inlet at the bottom, a bottom outlet about ½ inch in diameter for removal of polymer, and a steam-jacketed condenser at the top for condensation of metaxylylenediamine and removal of steam and nitrogen.

Metaxylylenediammonium adipate salt is continuously fed into the tube at the rate of 1 gram per minute, and nitrogen continuously bubbled through the reaction mass at a rate of about 50 to 60 cc. per minute, the temperature in the reaction zone being maintained at 500° F. to 520° F.

Polymer having a reduced viscosity of 1.2 to 1.3 is continuously withdrawn from the bottom outlet at a rate of about slightly less than 1 g. per minute, while nitrogen, steam and some uncondensed metaxylylenediamine is continuously withdrawn from the condenser, the total residence time in the tube being 5 to 6 hours. The finished polymer can be processed into a high-tenacity fiber (8.3 to 10 g./denier).

As another example of the practice of the invention employing apparatus similar to that shown in the drawings, metaxylylenediammonium adipate salt is continuously conveyed by means of the screw conveyor into the upper zone of the reaction chamber heated at a temperature of about 500° F. whereby solidification is prevented. Salt is introduced at the rate of about one-half pound per hour and the residence time of the molten polymer in the heated upper zone or compartment is about one-half to one hour. Polymer of about 0.5 to 0.8 reduced viscosity at 0.5% metacresol passes through the first melt grid in molten streams and during its descent further polymerizes. Progressively polymerizing it passes through the second melt zone, and about after one to two hours collects in the bottom of the chamber, wherein the polymerization is finished to produce a polymer of 1.3 reduced viscosity at 0.5% metacresol, the polymer being continuously withdrawn from the bottom of the reaction chamber. The temperature is maintained throughout the reaction chamber at about 500° F. During polymerization which takes about two to eight hours from the point of entering salt and issuing polymer nitrogen is continuously bubbled upwards through the molten reaction mass at a rate of ½ to one cubic foot per mount of issuing polymer. The nitrogen issuing from the reaction zone having entrained steam and dissociated diamine is passed through a steam jacketed condenser, wherein the diamine is condensed and returned to the reaction zone, the steam and nitrogen being allowed to escape from the system. On spinning and drawing of the finished polymer, fibers of 9 g./denier tenacity are obtained.

I claim:

1. Continuous process for the preparation of superpolyamide which comprises continuously freely dropping polyamide-forming diamine-dicarboxylic acid salt substantially free from water into a condensation zone, said condensation zone being maintained at melt polymerization temperatures and under substantially atmospheric pressure, allowing said salt to impinge upon heated surfaces to form low polymer with the liberation of water and to divide said low polymer, and to retard its flow, and to form progressively higher polymer with the liberation of water, allowing said higher polymer to drop freely from said surfaces into a molten polymer pool, continuously withdrawing polymer from said pool, continuously bubbling through the condensation zone an inert gas stream, to remove the liberated water and unreacted diamine, said inert gas stream being introduced into the condensation zone through the molten polymer pool, dividing the inert gas stream at the heated surfaces to disperse the inert gas stream through retarded higher polymer and retarded low polymer, withdrawing the water- and diamine-entrained inert gas stream at the end of the condensation zone opposite to that of the introduction of the inert gas stream, cooling the inert gas stream to condense diamine, and returning the diamine to the condensation zone.

2. Improvement according to claim 1 wherein the polyamide forming diamine-carboxylic acid salt is that of metaxylylenediamine and an α,ω-aliphatic dicarboxylic acid of 6 to 10 carbon atoms.

3. Improvement according to claim 2 wherein the salt is obtained from a mixture of metaxylylenediamine and from about 5 to about 50% of paraxylylenediamine, and α,ω-aliphatic dicarboxylic acid having an even number of carbon atoms from 6 to 10.

4. Improvement according to claim 3 wherein the temperature in the condensation zone is maintained 20° to 30° F. above the melting point of the polyamide.

5. Improvement according to claim 1 wherein the polyamide forming salt is metaxylylene diammonium adipate and the temperature in the condensation zone is maintained between about 470° and 510° F.

References Cited in the file of this patent

UNITED STATES PATENTS

| | | |
|---|---|---|
| 2,071,253 | Carothers | Feb. 16, 1937 |
| 2,224,037 | Brubaker et al. | Dec. 3, 1940 |
| 2,562,796 | Koch | July 31, 1951 |
| 2,596,272 | Moravec | May 13, 1952 |
| 2,766,221 | Lum et al. | Jan. 31, 1953 |
| 2,810,630 | Herele | Oct. 22, 1957 |
| 2,908,166 | Notarbartolo | Oct. 13, 1959 |
| 2,923,699 | Indest | Feb. 2, 1960 |

FOREIGN PATENTS

| | | |
|---|---|---|
| 516,889 | Belgium | Jan. 31, 1953 |